O. J. JOHNSON.
AGRICULTURAL MACHINE.
APPLICATION FILED JULY 16, 1917.

1,300,411. Patented Apr. 15, 1919.

Witness
A. J. Stenner
E. L. Mueller

Inventor
O. J. Johnson
By [signature]
Attorneys

UNITED STATES PATENT OFFICE.

OLIVE J. JOHNSON, OF PARIS, TEXAS, ASSIGNOR OF ONE-HALF TO G. W. WORTHAM, OF PARIS, TEXAS.

AGRICULTURAL MACHINE.

1,300,411.

Specification of Letters Patent. Patented Apr. 15, 1919.

Application filed July 16, 1917. Serial No. 180,816.

*To all whom it may concern:*

Be it known that I, OLIVE J. JOHNSON, a citizen of the United States, residing at Paris, in the county of Lamar, State of Texas, have invented certain new and useful Improvements in Agricultural Machines; and I do hereby declare the following to be a full, clear, and exact description of the invention, such as will enable others skilled in the art to which it appertains to make and use the same.

This invention is an improvement in agricultural machines and has particular reference to plow, planter and stalk cutter attachments therefor.

An object of the invention is to provide improved mountings for a cultivator machine of ordinary construction whereby an attachment or implement of one character may be easily and quickly secured to the machine and removed therefrom and an implement of a different character substituted.

Another object is to provide mountings of this character which are simple in construction, easy to manufacture and effective in carrying out the purpose for which they are designed.

The inventive idea involved is capable of receiving a variety of mechanical expressions, one of which, for the purpose of illustrating the invention, is shown in the accompanying drawings, wherein.

Figure 1:
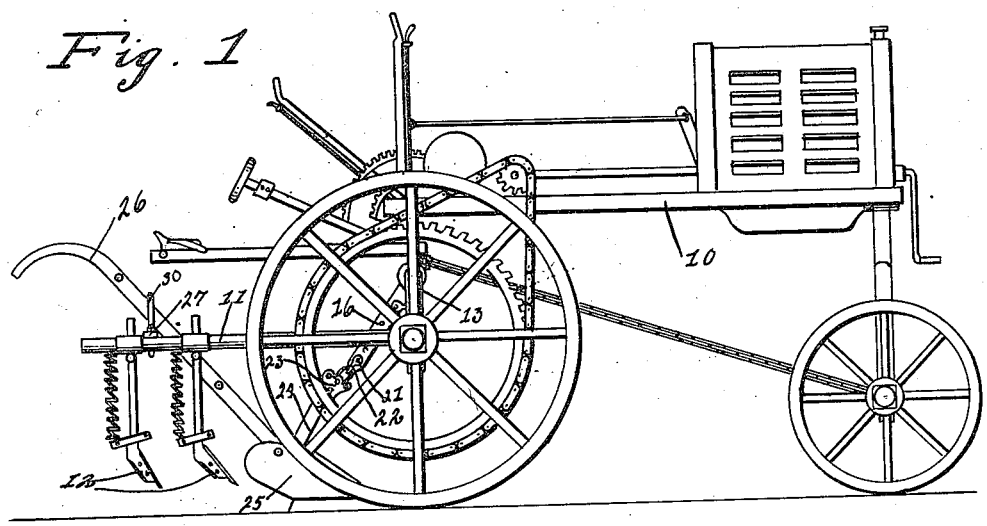
Figure 1 is a fragmentary side elevation of a cultivator machine of ordinary construction showing a plow attached thereto through the medium of the improved mechanism.
Figure 2:
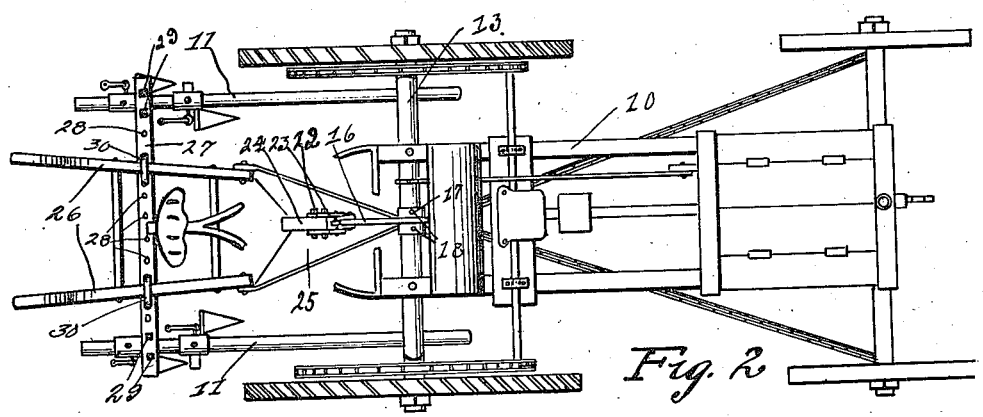
Fig. 2 is a top plan view.
Figure 3:
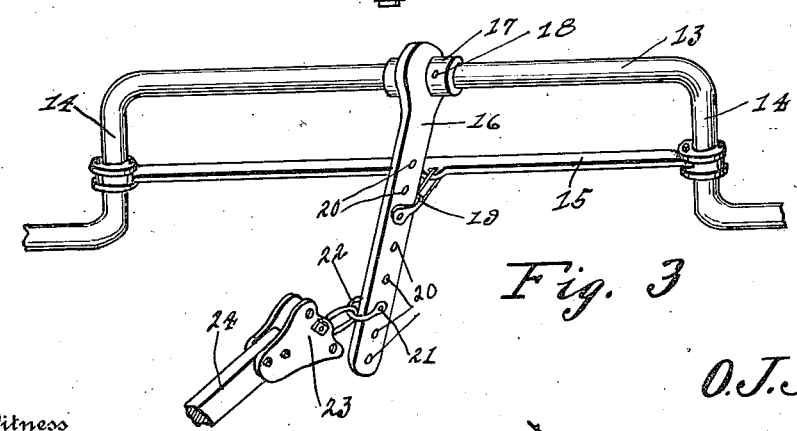
Fig. 3 is a perspective view of the mechanism for attaching the forward end of the plow or planter to the axle of the cultivator machine.

In the drawings the numeral 10 indicates the body of a cultivating machine which may be of any preferred construction but which is preferably of the self-propelled type. The machine includes the usual adjustable frame 11 which supports the removable plow points 12 employed when cultivating the ground.

It is proposed, in the present invention, to provide mountings for application to the cultivating machine whereby different kinds of farming implements, such as plows, planters, etc., may be attached to the machine and detached therefrom. In this manner when it is desired to employ a plow, the same may be attached to the machine and when the plowing process is accomplished, the plow may be removed and some other implement, such as a planter substituted in its place.

For the purpose of attaching a plow, or other similar implements, the machine is therefore provided with an arched axle 13 supported by the body of the machine and having the transverse portions 14 thereof connected by a detachable supporting rod 15. Intermediate the ends of the arched portion of the axle the same has mounted thereon a connecting bar or arm 16 having a bearing 17 at its upper end for receiving said axle, a set screw 18 being employed for securing said bearing in place. The arm 16 is adapted to extend downwardly and rearwardly and has connected thereto intermediate its ends a link 19 carried by the rod 15. The lower end of the arm 16 is provided with a longitudinal row of openings 20 any one of which is adapted to receive a bolt 21 for adjustably securing the link 22 to the arm, said link being shown as connected to the clevis 23 which is of ordinary construction and carried by the forward end of the beam 24 of a plow 25. It will thus be apparent that an implement may be easily and quickly connected to the arm 16 and detached therefrom.

The handles 26 of the implement are adapted to be detachably connected to the frame 11 of the machine, and, to this end, use is preferably made of a transverse supporting bar 27 mounted upon the side members of said frame and provided with a longitudinal row of openings 28, certain of which receive the U-shaped clamping bolt 29 employed for the purpose of attaching the bar to said frame. By the provision of the openings 28 it will be apparent that the clamps 29 may be adjusted longitudinally of the bar in order to accommodate cultivating frames of different widths. Other of the openings 28 have secured therein the inverted U-shaped handle clamps 30 through which the handles 26 of the implement extend and are secured to the bar 27 by tightening said clamps 30. In this manner the handles may be quickly secured in proper position and when disconnecting the implement from the machine it will only be necessary to remove the clamps 30 from the bar.

What is claimed is:—

1. The combination with a cultivating machine including a frame and an arched axle; of a mounting for farming implements including a supporting rod detachably secured to the arched portion of said axle, a connecting arm having a bearing for receiving said axle, said arm being arranged in a downwardly and rearwardly inclined position, a link connecting the intermediate portion of said arm with said supporting rod, and means adjustable longitudinally of said connecting arm for detaching the beam of a farming implement thereto.

2. The combination with a cultivating machine including a frame and an arched axle, of a mounting for farming implements including a supporting rod detachably secured to the arched portion of said axle, a connecting arm having a bearing for receiving said axle, said arm being arranged in a downwardly and rearwardly inclined position, a link connecting the intermediate portion of said arm with said supporting rod, means adjustable longitudinally of said connecting arm for detaching the beam of a farming implement thereto, a transverse supporting member mounted upon the frame of the cultivating machine, and clamps adjustably carried by the last named supporting member for receiving the handles of a farming implement whereby to secure the same to said supporting member.

In testimony whereof, I affix my signature in the presence of two witnesses.

OLIVE J. JOHNSON.

Witnesses:
W. A. HUTCHISON,
W. E. CLARKSON.